(12) United States Patent (10) Patent No.: US 7,828,639 B2
Nielsen (45) Date of Patent: Nov. 9, 2010

(54) METHOD AND SYSTEM FOR MONITORING THE PROCESSING OF ITEMS

(75) Inventor: Ulrich Carlin Nielsen, Ry (DK)

(73) Assignee: Scanvaegt International A/S, Arhus N (DK)

( * ) Notice: Subject to any disclaimer, the term of this patent is extended or adjusted under 35 U.S.C. 154(b) by 1637 days.

(21) Appl. No.: 10/508,638

(22) PCT Filed: Mar. 18, 2003

(86) PCT No.: PCT/DK03/00183

§ 371 (c)(1),
(2), (4) Date: Mar. 17, 2005

(87) PCT Pub. No.: WO03/077662

PCT Pub. Date: Sep. 25, 2003

(65) Prior Publication Data

US 2005/0186896 A1 Aug. 25, 2005

(30) Foreign Application Priority Data

Mar. 18, 2002 (DK) .......................... PA 2002 00423

(51) Int. Cl.
*A22B 5/00* (2006.01)
(52) U.S. Cl. ..................................... 452/198
(58) Field of Classification Search ............... 452/52, 452/53, 106, 149, 150, 155–157, 198
See application file for complete search history.

(56) References Cited

U.S. PATENT DOCUMENTS

| 3,940,998 | A | | 3/1976 | Sourby et al. |
| 4,228,685 | A | | 10/1980 | Wallace et al. |
| 4,256,569 | A | | 3/1981 | Wallace |
| 5,133,687 | A | * | 7/1992 | Malloy .......................... 452/149 |
| 5,162,016 | A | * | 11/1992 | Malloy ......................... 452/149 |
| 5,205,779 | A | * | 4/1993 | O'Brien et al. ............... 452/157 |
| 5,306,205 | A | * | 4/1994 | Gilles ........................... 452/198 |
| 5,334,084 | A | * | 8/1994 | O'Brien et al. ............... 452/157 |
| 5,406,770 | A | | 4/1995 | Fikacek et al. |

(Continued)

FOREIGN PATENT DOCUMENTS

WO 01/27567 4/2001

(Continued)

*Primary Examiner*—Thomas Price
(74) *Attorney, Agent, or Firm*—Pearne & Gordon LLP

(57) ABSTRACT

A method for monitoring and tracking the processing of a plurality of meat items which originated from an animal, with the processing utilizing instructions, such as instructions from a customer. The method comprises the steps of registering one or more of an identification of one piece of meat from the plurality of meat items, an identification of a supplier of the one piece of meat, and an identification of the animal from which the one piece of meat originated; allocating the one piece of meat to one of a plurality of workstations; registering an identification of the workstation; processing the one piece of meat into a plurality of meat cuttings at the workstation utilizing the instructions; and further processing one or more of the plurality of meat cuttings, wherein traceability is established between the one or more of the plurality of meat cuttings and one or more of the one piece of meat, the supplier, and the animal from which the one piece of meat originated.

42 Claims, 4 Drawing Sheets

U.S. PATENT DOCUMENTS

Figure 1:
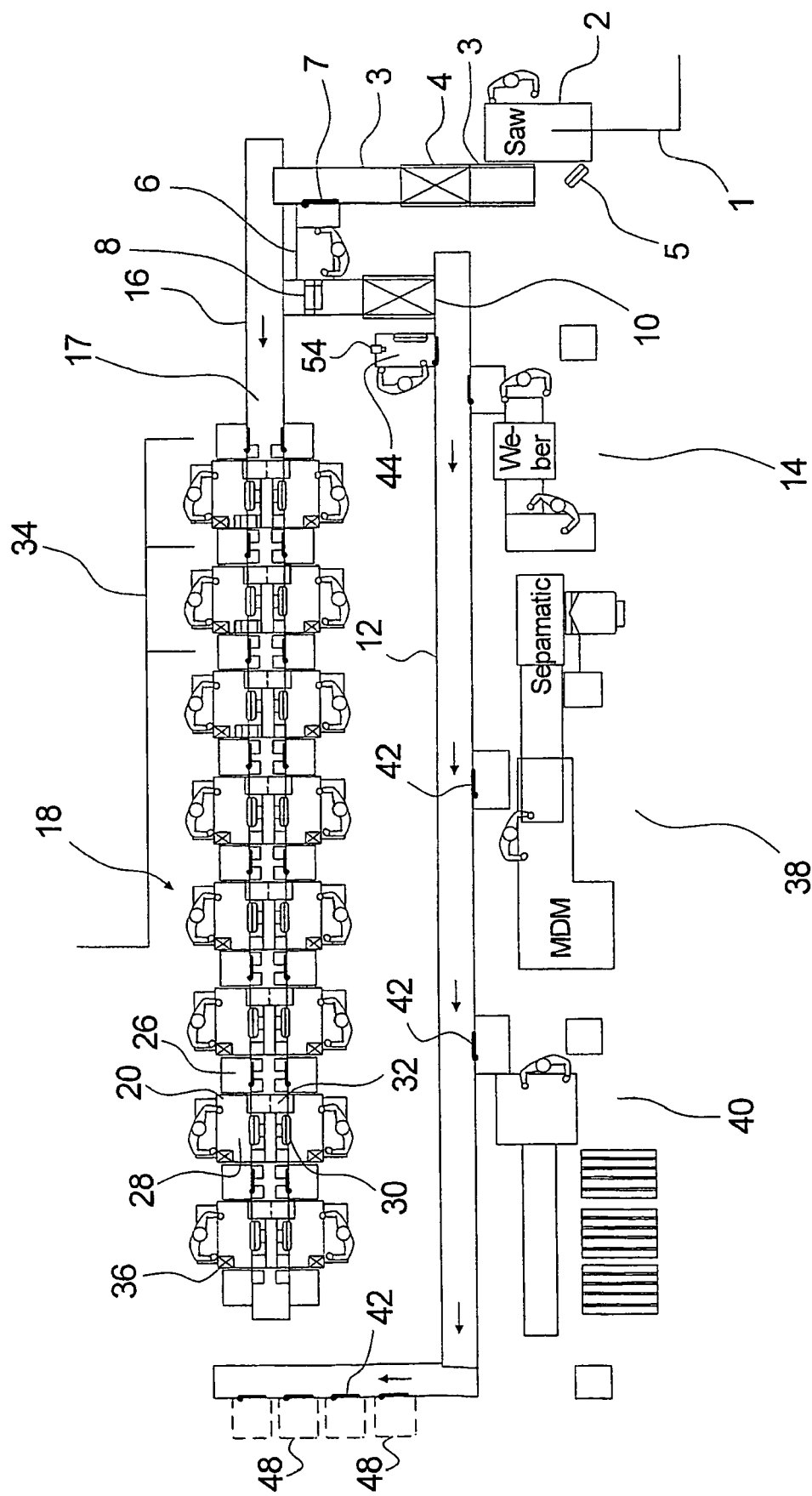

| | | | |
|---|---|---|---|
| 5,478,990 A | 12/1995 | Montanari et al. | |
| 5,666,493 A * | 9/1997 | Wojcik et al. | 705/26 |
| 5,673,647 A * | 10/1997 | Pratt | 119/51.02 |
| 6,000,361 A * | 12/1999 | Pratt | 119/51.02 |
| 6,104,966 A | 8/2000 | Haagensen | |
| 6,135,055 A * | 10/2000 | Pratt | 119/51.02 |
| 6,151,866 A | 11/2000 | Connell et al. | |
| 6,267,661 B1 | 7/2001 | Melville | |
| 6,318,289 B1 * | 11/2001 | Pratt | 119/51.02 |
| 6,321,135 B1 | 11/2001 | Asgeirsson | |
| 6,443,828 B1 | 9/2002 | Melville | |
| 6,516,746 B2 * | 2/2003 | Pratt | 119/51.02 |
| 6,546,304 B2 | 4/2003 | Thorvaldsson et al. | |
| 6,579,236 B2 * | 6/2003 | Pratt | 600/437 |
| 6,664,897 B2 * | 12/2003 | Pape et al. | 340/573.3 |
| 6,712,221 B2 | 3/2004 | Kvisgaard et al. | |
| 6,805,075 B2 * | 10/2004 | Pratt | 119/51.02 |
| 6,859,672 B2 * | 2/2005 | Roberts et al. | 700/89 |
| 6,878,052 B2 * | 4/2005 | Andersson | 452/149 |
| 7,043,497 B1 * | 5/2006 | Carty et al. | 1/1 |
| 7,050,995 B2 * | 5/2006 | Wojcik et al. | 705/28 |
| 7,058,596 B1 * | 6/2006 | Wojcik et al. | 705/26 |
| 7,316,202 B2 * | 1/2008 | Fantin et al. | 119/174 |
| 7,347,161 B2 * | 3/2008 | Pratt | 119/51.02 |
| 7,464,666 B2 * | 12/2008 | Pratt | 119/712 |
| 7,464,667 B2 * | 12/2008 | Pratt | 119/712 |
| 7,519,631 B2 * | 4/2009 | Roybal et al. | |
| 7,607,405 B2 * | 10/2009 | Pratt | 119/51.02 |
| 7,613,330 B2 * | 11/2009 | Mirtsching et al. | 382/110 |
| 2004/0082291 A1 | 4/2004 | Thorvaldsson et al. | |

FOREIGN PATENT DOCUMENTS

| | | |
|---|---|---|
| WO | WO 01/91565 A1 | 12/2001 |
| WO | 02054876 A1 | 7/2002 |

* cited by examiner

METHOD AND SYSTEM FOR MONITORING THE PROCESSING OF ITEMS

This patent application claims priority from prior PCT application No. PCT/DK03/00183, filed Mar. 18, 2003, now Publication No. WO 03/077662, dated Sep. 25, 2003, which designated the U.S. and was published in the English language, which claims priority from Danish patent application No. PA 2002 00423, filed Mar. 18, 2002.

FIELD OF THE INVENTION

The invention relates to a method and a system for monitoring the processing of items such as pieces of meat, including carcasses of pigs, calves, beeves etc., and poultry, fish etc.

BACKGROUND OF THE INVENTION

It is commonly known that animals raised for slaughtering such as pigs, calves, beeves etc. are provided with unique identification, for example in the form of a tag, an earmark or the like with a bar code, number, electronic or other form of identification. It is thus also known to use such identification for example in a slaughterhouse, so that diverse data such as weight, fat percentage, quality etc. can be registered in relation to the individual animal and/or in relation to the individual supplier.

Systems for the processing of pieces of meat are also already in existence where the systems are arranged in such a manner that the individual pieces of meat can be traced when they are conveyed through the systems, for example by a conveyor belt. Such systems are also to be found which are arranged to be able to trace pieces of meat which at processing stations are cut up into two or more pieces, i.e. that the individual products can be traced back to that piece of meat from which they are cut.

From WO 95/25315 A1 there is thus known a method for monitoring the transport and processing sequence, for example for pieces of meat, including carcasses, where these carcasses are suspended from hooks with means of identification, which are intended for optical identification by means of digital cameras disposed along the route/the routes and a computer system. At the cutting-up of the pieces of meat, where the individual part items are transferred to a conveyor belt, use is also made of digital cameras for identification of the individual cuts of meat by use of a picture analysis, so that these meat pieces can also be followed through the processing by means of the computer system, until at the exit from the system there can be produced labels with information concerning identification, origin etc. for the individual pieces of meat.

Further, a similar method is known from WO 01/91565 A1, where carcasses are provided with an associated identification ID such as a label, a tag or the like. These carcasses are sawn into quarters and are distributed to one of four subsequent de-boning stations, either automatically or manually, for example by the operator observing where there is capacity at disposal and at the same time the correlation between ID and de-boning station is registered in the system. With this system, two cutting-up stations are associated with each de-boning station and when a quarter carcass has been de-boned, it is allotted to one of the two cutting-up stations. Since the allotment to the two cutting-up stations alternates, i.e. regardless of the working speed of the two employees at the two cutting-up stations, a quarter cut will always be allotted to that of the two cutting stations which did not receive the preceding quarter cut, the correlation between the ID for each quarter cut and each cutting-up station will be determined and registered in the computer system. Hereafter, a cutting-up of the de-boned quarter parts is carried out, possibly while making use of an instruction on a screen, which informs the worker how the piece shall be cut up. When a worker is finished with the cutting-up of a quarter part (with a division in up to four portions, e.g. a primary cut, fat and further two fractions, each placed in its own container, tray or the like), the system is informed—by the worker activating a button or the like—that the cutting-up of this quarter part is finished, after which the contents of at least the container with the primary cut is carried forward via a conveyor belt for weighing, packing or other further processing. The system will have registered an ID for this or these portions, i.e. which animal they come from etc., which can be transferred to a label or the like for the cut-up portion(s).

As will appear, the identification of the individual pieces of meat is based among other things on an allocation of quarter carcasses being effected from a primary cutting-up station to the subsequent de-boning stations and that from these there is effected a predetermined alternate allocation of quarter de-boned parts to two subsequent cutting-up stations. It is thus seen that this known system operates with a fixed structure. It is thus also seen that the capacity of the individual workers will be limited by the preceding workers in this system, this being due to the structure with branching in the direction of transport. Moreover, in particular, it will be seen that since the de-boned quarter parts are allotted alternately to the two workers at the subsequent cutting-up stations, the utilisation of the capacity can be less than optimal, for example if one of the two workers has a greater capacity than the other, whereby the first can find himself having to wait, either until the other worker is finished with a cutting-up, or until the person at the de-boning station sends a quarter part further.

Thus, it is an object of the invention to present a method and a system for the processing of pieces of meat whereby a traceability of the meat pieces is ensured during the processing.

It is especially an object to present such a method and such a system, which takes into regard an expedient utilisation of the manpower involved.

A further object is to present such a method and such a system which supports an expedient cutting-up of meat pieces, for example while paying regard to requirements and demands from the receiver/customer.

It is also an object to present such a method and such a system, which ensures a flexible utilisation of the processing plant.

It is also an object to ensure that the level of quality fulfils the stipulated demands.

These and other objectives are achieved with the invention, as will appear in more detail from the following.

The Invention

The invention relates to a method for monitoring the processing of items such as pieces of meat, including carcasses of pigs, calves, beeves and the like, and poultry, fish etc., where use is made of an identification for the individual animals and/or the individual items or part items and where the processing involves the cutting-up into smaller meat pieces, said method comprising that a registration of an identification for a meat piece is effected, the meat piece is allotted to one of a multiple of work stations and an identification for the said work station is registered, the allotted meat piece is processed at the work station while use is made of instructions, and a further transport of the whole or parts of the yield from the allotted meat piece is established, such as one or more cuts, this being registered so that traceability of the meat pieces is established, also including the cut-off pieces.

Hereby, an expedient processing flow is achieved where the allocation of meat pieces to the individual work stations can be effected in relation to the concrete situation, for example while taking into consideration which cuts are desired, regard being paid to a customer order (or several customer orders which are to be fulfilled) and with regard being paid to the given distribution of specialist ability at the individual work stations, also possibly with regard being paid to the yield registered at the individual operator, at earlier processes and/or at the present processing, i.e. with updated data. Inasmuch as it is registered to where the individual meat piece is forwarded, at the same time there can be established expedient and dynamic instructions for the respective workstations, in that use is made of the association between data for the allotted meat pieces and the location for the individual workstations where the instruction is displayed. Moreover, situations such as requirements concerning one or more actual deliveries can hereby be taken into consideration. It shall be noted that use can be made of a wide range of means as identification for the relevant item. As mentioned by way of introduction, use can be made of tags, earmarks or the like with a bar code, a number, an electronic or other form of identification. Other possibilities can also be utilised in connection with the invention, such as bio-codes, genetic identification, electromagnetic identification, magnetic identification etc.

As disclosed in claim 2, the processing of meat pieces, including the cutting-up into smaller pieces, can expediently be effected while paying regard to one or more orders, so that the allocation of meat pieces to workstations and/or the furnishing of instructions, also including visual instruction to the respective workstations, is carried out with the view of the fulfilling of said one or more orders. By this method, there can thus be effected a cutting-up of the meat pieces in an effective manner so that a concrete customer order can be produced, or possibly so that several concrete customer orders can be produced simultaneously. The concrete customer orders can be specified on the basis of parameters such as fat percentage, types of cuts from which part cuts are to be made, size and/or weight of the individual meat pieces etc. By using a central control and/or several local controls, there can thus be effected an allocation of meat pieces to the respective workstations, while at the same time the individual workstations are provided with specific and concrete instructions concerning how the cutting-up is to be carried out. This can thus be effected without the individual worker having to keep track of the orders to which deliveries shall be made. Inasmuch as traceability is established, the cut-up pieces san be sent further from the individual workstations, after which those pieces which shall form part of a concrete customer order can be transported selectively to different places of collection, where for example a weighing, packaging, further processing, marking etc. is carried out.

As disclosed in claim 3, an allocation of meat pieces can expediently be carried out while paying regard to predetermined criteria, including the capacity of the individual workstations. The distribution can thus take place automatically or manually, for example while paying regard to where capacity is available and/or the expectation of capacity soon to be available. The desire can hereby be fulfilled regarding an overall optimum through-flow in the system and a high production.

By an advantageous embodiment, as disclosed in claim 4, after registration of an identification for a meat piece a coarse parting of the meat piece can be carried out, after which the individual items are conveyed further, preferably in a predetermined sequence. For example, the coarse parting can be effected as the cutting up of a whole carcass into neckpiece, shoulder, middle and ham. When transported further, it will be ensured that the individual pieces can be traced to the individual animal from which they originate. This can be effected, for example, by the further transport always taking place in a certain sequence, but other forms can also be envisaged, for example if at the coarse parting a code or the like is associated with the individual pieces either manually or automatically.

By a further advantageous embodiment, as disclosed in claim 5, the cuts of items can be placed in or on transport parts, such as directly on conveyor belts or in bins, on plates, hooks or the like, whereby the individual cut or the individual item can be traced and/or is identifiable. The traceability will hereby be ensured in an expedient manner, especially when the processing involves smaller pieces of meat and particularly when several of these items are transported further in portions comprising two or more pieces of meat, all originating from the same animal or the same piece of meat.

As disclosed in claim 6, the passage of items along transport routes can expediently be detected, this information being registered and/or used for establishing traceability. The identification for the individual pieces of meat can hereby be retained during the transport, for example along conveyor belts, where sensors, e.g. optical sensors, are placed at suitable intervals. An overriding aspect is that the sequence, admission and/or exit to and from e.g. the conveyor belt will be known and together with the detections this will mean that the passage of a given piece of meat with a known identification past a sensor will be registered and the removal of an item will also be registered. This can be further combined with other functions and/or information, e.g. the allocation of a given piece of meat to a workstation, so that the activation of a mechanism, e.g. an arm, takes place on the basis of the registered information.

The traceability can be established in various ways, which will be exemplified in brief. For example, use can be made of the First-in First-out method, where items are led out on to a conveyor section, inasmuch as the sequence (and the speed of transport) are known. At the point of arrival, the identity of the arriving items will be given in the sequence, i.e. if items have not been removed along the way. This can be combined with the use of sensors, for example a sensor placed at a given point along the transport route. With knowledge of the speed of transport, for example the speed of a conveyor belt, a time window can be calculated at which a given item will pass the sensor. The existence of the items dispatched can hereby be confirmed, and/or removal of an item can be ascertained since there will not be any detection in the given time window. Hereafter, the information registered can be adjusted. It will be understood that regard can also be paid to the situation when a system removes an item in a controlled manner, for example by means of an ejector arm or the like which is controlled to remove an item in a certain time window. It will also be understood that use can be made if necessary of several sensors along a transport section. Other known methods and/or combinations hereof can be used, such as will be well known to those familiar with the art.

By a particularly advantageous embodiment, as disclosed in claim 7, the cutting of items can be placed with regard to concrete instructions given to an operator, so that one or more locations, for example compartments, bins or the like, can be used in a flexible manner for positioning of the said cuts and/or items. The individual workstation and/or its individual parts will hereby be able to be utilised in an optimal manner. If, for example, the types of cuts to be made from an allotted piece of meat are more in number than there are bins or the like directly available for, this embodiment still enables this to be done. Since visual instructions is given to the operator at the individual workstation, also including information concerning the sequence of the individual process stage, the placing of the cut pieces can be carried out with regard to concrete instructions and, e.g. in such a manner that after the conclusion of a type of cut from a meat piece, these cuts can be transported further, after which the given bin can be used for another purpose. The individual bins and the like can also change function from the cutting of one meat piece to the next, in that a workstation thus does not necessarily need to be directly dedicated the whole time to the cutting of one type of meat piece. If, for example, the operator at a workstation has the necessary skill and the necessary capacity, this workstation can be used for the processing of different types of meat pieces, so that an accumulation of certain types of cuts does not occur which are otherwise intended for workstations where operators mainly undertake the cutting of a certain type of meat pieces. This will thus further enhance the flexibility and the through-flow capacity in the processing of the meat pieces.

In an advantageous manner, as disclosed in claim 8, instruction can be provided at the cutting, preferably specific in relation to the concrete item, said instructions being provided visually, preferably via a screen, and said instructions can be controlled automatically and/or can be user controlled. The method can thus be arranged in such a manner that there is automatically selected a cut which, for example, satisfies demands from a receiver of a given delivery, i.e. a customer order, or the system can be arranged in such a manner that the operator can choose between a number of possibly different instructions, which will satisfy the given actual demands, and/or choose not to follow a given instruction.

By a further advantageous embodiment, as disclosed in claim 9, text and/or audio-based instructions can be provided in connection with the cutting. For example, this can be done by making use of a display, a screen or the like for the displaying of text instructions and/or headsets, ear-sets, loudspeakers or the like for the communication of audio instructions and it will be understood that, for example, if the visual instructions are not adequate, or if an operator requests concrete instructions from a system or a person, the operator will be able to select such an option. It shall be noted that with the use of textual instructions, it is possible to operate expediently with standard texts, which can possibly be selected by means of codes, so that the instructor can communicate an instruction quickly and effectively.

By a further expedient embodiment, such as disclosed in claim 10, a weighing of a cut piece of meat can be effected in connection with the cutting and in connection with such a weighing it can be possible for information to be provided immediately concerning how great a deviation there is from a criterion for a cut. Hereby, a worker can easily check whether a cut meets the demands and possible tolerances which can be given for the relevant cut and which can be informed by a visual instruction preferably by means of a screen or the like. Furthermore, the system can be arranged in such a manner that it can be shown directly, either by a weight display or preferably via the screen that weight which shall be cut off in order for the demand to be fulfilled. The worker taking the meat piece back on to the cutting plate, after which a suitable portion is cut off and placed on the scale, can expediently carry this out, after the weighing of the relevant piece of meat. It can thus be seen whether the weight of this cut-off piece is sufficient to fulfil the demand and, if not, the worker can cut off a further piece and place it on the scale (together with the first), after which it can again be seen whether the demand is met. This can be repeated several times until it is indicated on the display or screen that the weight is satisfactory, after which the piece of meat from which the cuts have been taken can be placed on a tray or the like or sent directly further, still with regard for the retention of the traceability. The piece or pieces which have been cut off are removed from the scale and are placed with regard to the concrete instruction in a container, a bin or the like, after which it is used in the further processing.

By yet a further expedient embodiment, as disclosed in claim 11, a quality control can be implemented in connection with the cutting and by use of vision equipment a possible adjustment of the said visual instructions can be made. It can hereby be ensured that the processing fulfils the demands, which have been placed on a given delivery and/or cut. Moreover, the operator who has carried out the processing of a given piece of meat by using vision equipment can hereby be provided with feedback, for example at the quality control where there is a camera, which can be coupled to the equipment for the visual instruction. As mentioned, the visual instructions can thus hereby also be adjusted. It shall be noted that at the quality control, among other things use can also be made of electronic means for measurement and/or indication of the quality, for example by a registration of the colour and the like of the meat pieces.

By a further expedient embodiment, as disclosed in claim 12, a quality control can be effected in connection with the cutting and possibly by the use of vision equipment a storing of data concerning the quality-controlled items can be made in a database. With the use of vision equipment, documentation can hereby be registered for the level of quality of a portion, in that video sequences and/or stills can be registered in association with identification for the individual meat piece (s) or portions of meat pieces. This documentation can e.g. be presented to the customer via the Internet, by electronic transfer, by downloading etc. Furthermore, it shall be noted that this can be done before delivery and/or in connection with the entering of a contract or in connection with the negotiating of deliveries.

As disclosed in claim 13, documentation for the registered level of quality can preferably be established in connection with the said quality control, for example by the storage of data for controlled items, data for identification of these items, data concerning customer orders, data concerning the manpower involved and/or data concerning suppliers, this data being stored and additionally used as documentation, for example as documentation of the quality level for a given customer order. In an expedient and advantageous manner, there can hereby be established a demanded and/or desired documentation for the quality of a customer order which can be forwarded to the customer. Moreover, this embodiment can be used for establishing documentation concerning e.g. a worker's competence and professional skills.

As disclosed in claim 14, it is expedient that in connection with the said quality control use can also be made of textual and/or audio communication, for example to and from an operator and/or to a quality inspector, whereby the exchange of information can be supported. It shall be noted that with the use of textual instructions, it can be expedient to operate with standard texts, which can possibly be selected by means of codes, so that the instructor can communicate an instruction quickly and effectively.

By yet a further advantageous embodiment, as disclosed in claim 15, upon conclusion of a cutting-up of an item or a part item, an indication of this is effected either automatically or by action, so that a cutting-up of a subsequent item with associated identification is initiated. It can hereby be registered that the cutting-up of a given piece of meat has been concluded and the further transport of these cuts can be initiated at the same time as this is registered, thus ensuring traceability for these cuts. Moreover, it can be registered that an operator begins the cutting-up of a new piece of meat, which has possibly been lying in a waiting position, or which is allocated immediately after the operator has reported the conclusion of the foregoing task. This report can be made, e.g. by the operator sweeping his knife past a detector or in any other suitable manner.

With the method as disclosed in claim 16, it is expedient to effect a monitoring and/or control of conditions of significance for the quality of the finished cut-up product, for example replacement/cleaning of materials such as cutting plates, conveyor belts, containers etc. For example it can be determined when a cutting plate shall be turned, e.g. after the cutting-up of three allotted meat pieces and it can be registered when a cutting plate has already been turned and where a change to a cleaned cutting plate thus shall be made after the predetermined number of cuttings. The method will hereby support the achieving of the given standard for hygiene and quality. In association herewith, with the method it can be registered to what extent the desired action actually is undertaken, e.g. the replacement of a cutting plate. For example, this can be effected by a sensor being associated with the cutting plates, whereby turning and/or replacement is registered. If the desired action is not implemented according to this embodiment it can be prevented that new pieces of meat are allocated to the workstation. Moreover, with this method a control/monitoring of cleaning of e.g. conveyor belts can be effected, e.g. at certain intervals etc.

Furthermore, the method can comprise registration of special cases such as the discovery of an abscess in a piece of meat, which for example takes place by the entering of data by the operator. It is hereby ensured with the method that the necessary actions are undertaken outside of normal routine, e.g. the changing of cutting plates and knife or knives, cleaning of materials such as conveyor belts, containers etc., which similarly serves to achieve and maintain the level of quality and hygienic standard.

By a further advantageous embodiment, as disclosed in claim 17, information concerning one or more operators can be registered, for example information concerning competence, education, professional skills, yield and/or other characteristics. A number of advantages are hereby achieved in connection with the invention, where each individual operator will have an identification, which is registered in the system either by the operator or in another manner. For example, the operator can enter a code or pass a personal card through a card scanner when he/she commences work at a workstation. It will hereby be known by the system control which tasks the relevant person can carry out, which complex tasks the person can carry out and whether the person can carry out several different types of tasks and so on. With this method an optimal distribution of work can hereby be achieved and/or an expedient, optimal and/or required quality level and a uniform quality in the processing can also be achieved.

As disclosed in claim 18, it is advantageous that the processing of the items, including the cutting-up of slaughtered animals such as carcasses of pigs, calves, beeves etc., and poultry, fish etc., can be effected in such a manner that the cuts taken from the items, including carcasses and/or parts hereof, can be traced and/or are identifiable, for example in relation to suppliers, classification and/or the individual animal.

The invention also relates to a system for the monitoring of processing of items such as pieces of meat, including carcasses of pigs, calves, beeves etc., and poultry, fish etc., where the system comprises means for identification of the individual animal and/or the individual item or part items and where the processing involves the cutting-up into smaller pieces, said system comprising:

means for the registration of an identification for a piece of meat, means for the allocation of the piece of meat to one of a multiple of workstations, inasmuch as an identification for the said workstation is registered, equipment for displaying visual instructions at the workstation during the processing of the allocated piece of meat, means for the further transport of the whole or parts of the yield from the allocated piece of meat, such as one or more cuts, in that this is registered so that a traceability for the meat pieces is established, also including the cuts.

With such a system an expedient processing flow is achieved where the allocation of meat pieces to the individual workstations can be effected in relation to the concrete situation, for example with regard to which cuts are desired, with regard to a customer order (or several customer orders which shall be expedited) and with regard to the given allocation of professional skills at the individual workstations. Inasmuch as according to the system it can be registered to which workstation the individual piece of meat is to be forwarded, at the same time there can be established an appropriate and dynamic instruction to the respective workstations, in that use is made of the association between data for the allocated meat pieces and the location of the individual workstation where the instruction is shown. Moreover, situations such as demands concerning one or more relevant deliveries can hereby be taken into consideration.

As disclosed in claim 20, it is expedient that the system can comprise control means, preferably in computer form, said control means being arranged to process the said registrations and allocations and which can establish the said traceability.

With a further expedient embodiment, as disclosed in claim 21, the said control means can be arranged, with regard to one or more registered customer orders, to be able to allocate meat pieces to the said workstations and to be able to provide instructions, including visual instructions, to the respective workstations so that the customer order or orders can be complied with.

By yet another expedient embodiment, as disclosed in claim 22, said control means can be arranged for the control or monitoring of allocation of meat pieces while taking predetermined criteria into consideration, including the capacity of the individual workstations.

As disclosed in claim 23, it is advantageous that the system can be arranged in such a manner that a coarse parting can be carried out after the registration of an identification for a piece of meat, after which the individual items are transported further, preferably in a predetermined sequence and whereby a sequence of the items transported further is registered.

By a further expedient embodiment, as disclosed in claim 24, the system can comprise means for storage and/or transport of cuts of items, such as conveyor belts, trays, plates, hooks or the like, whereby the individual cuts or the individual item can be traced and are/is identifiable, in that the said means are given an identification and/or are monitored by the system.

In an advantageous manner, as disclosed in claim 25, the system can comprise means, for example sensors, for the detection of passage of items along transport routes and means for the registration, processing and/or use hereof for establishing of traceability.

By a further expedient embodiment, as disclosed in claim 26, the system can comprise one or more locations, for example, compartments, trays or the like, for receiving the cuts of meat with regard to concrete instructions to an operator, so that the said location or locations, for example compartments, trays or the like, can be used in a flexible manner for said cuts and/or items.

As disclosed in claim 27, it is advantageous that instructions can be provided at the cutting station, preferably specific in relation to the relevant item, which instruction can be provided visually, preferably via a screen and which instruction can be controlled automatically by the system and/or can be user-controlled.

As disclosed in claim 28, the system can expediently comprise means for the communication of textual and/or audio-based instructions in connection with the cutting, for example via displays, headsets etc.

According to a further expedient embodiment, as disclosed in clam 29, one or more of said workstations can comprise a set of scales, whereby in connection with the cutting a weighing of a cut taken from the meat piece can be effected and in connection with the weighing the system can possibly provide immediate information concerning how great a deviation there is from a weight criterion for a cut.

With a further expedient embodiment, as disclosed in claim 30, the system can comprise means, which facilitate a quality control in connection with the cutting and with the use of visual equipment the system can comprise means for carrying out a possible adjustment of the said visual instruction.

As disclosed in claim 31, it is expedient that the system can comprise means, which facilitate a quality control in connection with the cutting and with the use of visual equipment to carry out storage in a database of data concerning quality-controlled items.

As disclosed in claim 32, it is expedient that the system can comprise means in connection with said quality control for establishing documentation for the registered level of quality, for example by the storage of data for controlled items, data for the identification of these items, data concerning customer orders, data concerning the workforce involved and/or data concerning suppliers, said data being stored and also used as documentation, for example documentation for quality level for a given customer order.

As disclosed in claim 33, it is expedient that in connection with said means which facilitate the said quality control, means are included for textual and/or audio communication, for example to and/or from an operator and/or to or from a quality inspector.

By a further expedient embodiment, as disclosed in claim 34, the system can comprise means for registration of a conclusion of a cutting-up of an item or part item, for example automatically or in connection with an action for the indication hereof, whereby the system can initiate a cutting-up of a subsequent item with an identification associated herewith.

In an advantageous manner, as disclosed in claim 35, the system can comprise means for monitoring and/or control of situations which are significant for the quality of the finished product, for example the changing/cleaning of materials such as cutting plates, conveyor belts etc.

By yet a further expedient embodiment, as disclosed in claim 36, the system can comprise means for the registration of information concerning one or more operators, for example information concerning competence, training, professional skill, output and/or other characteristics.

As disclosed in claim 37, the system for the cutting-up of items such as slaughtered animals, including carcasses of pigs, calves, beeves etc., and poultry, fish etc., can comprise means for tracing and/or identification of cuts of items, including those from carcasses, and/or parts hereof, for example in relation to supplier, classification and/or the individual animal.

THE DRAWINGS

Figure 2:
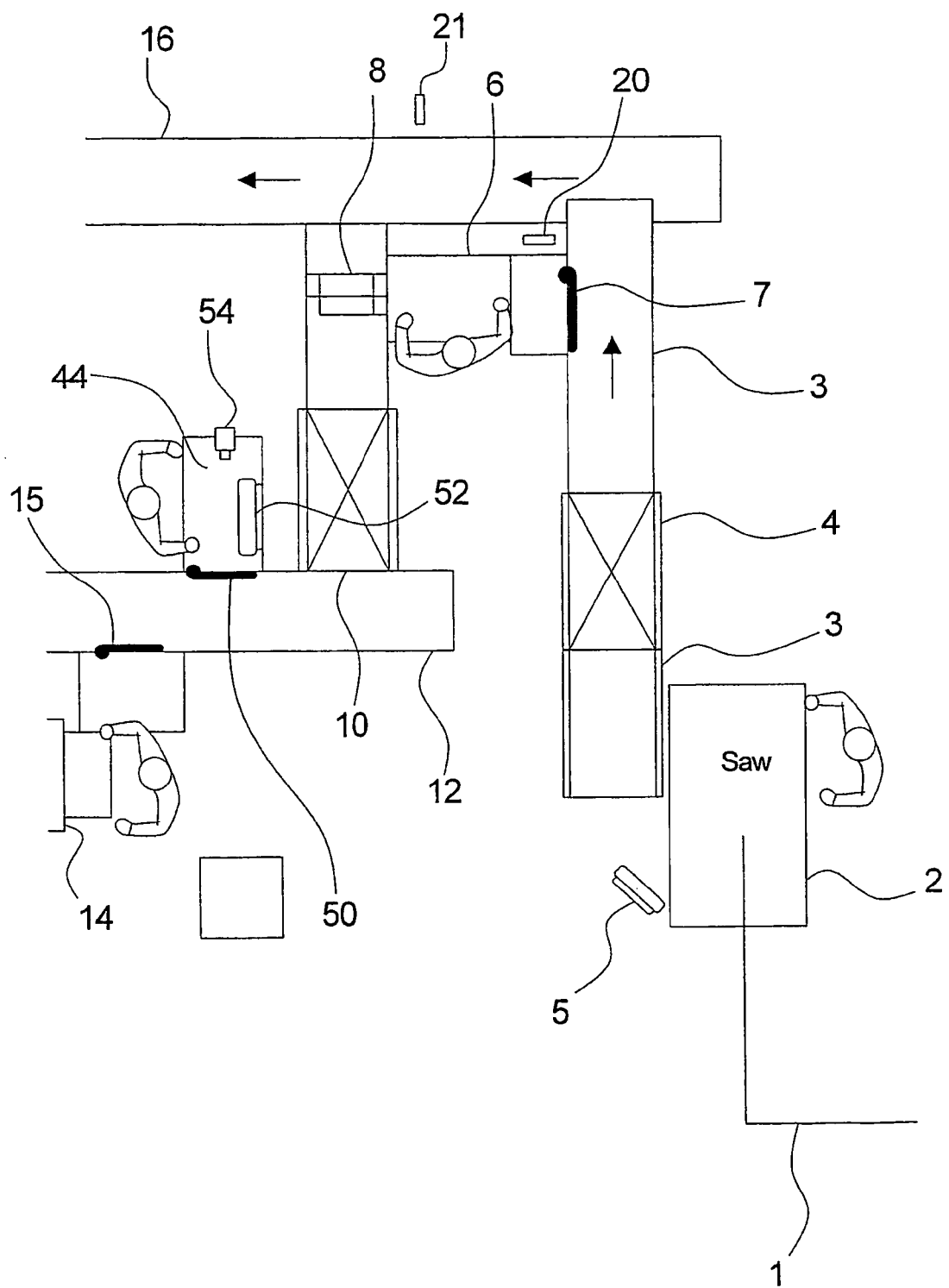
Figure 3:
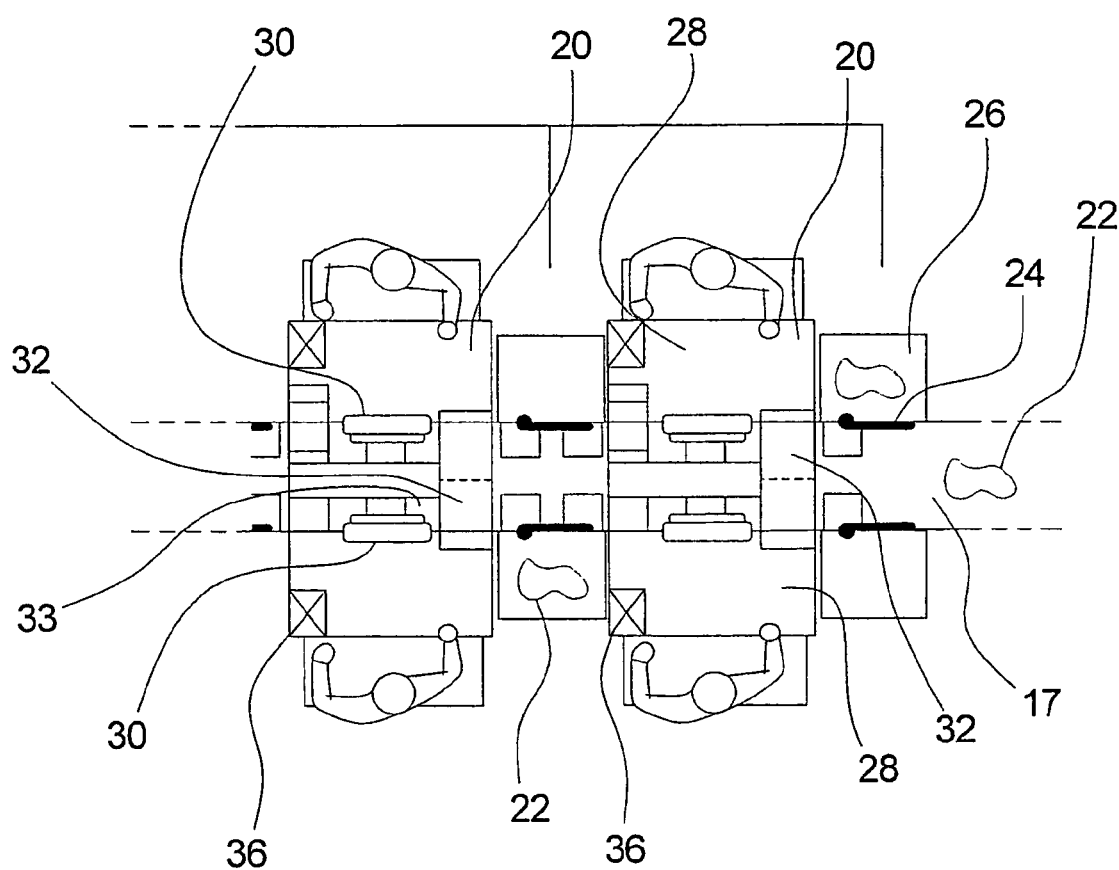
Figure 4:
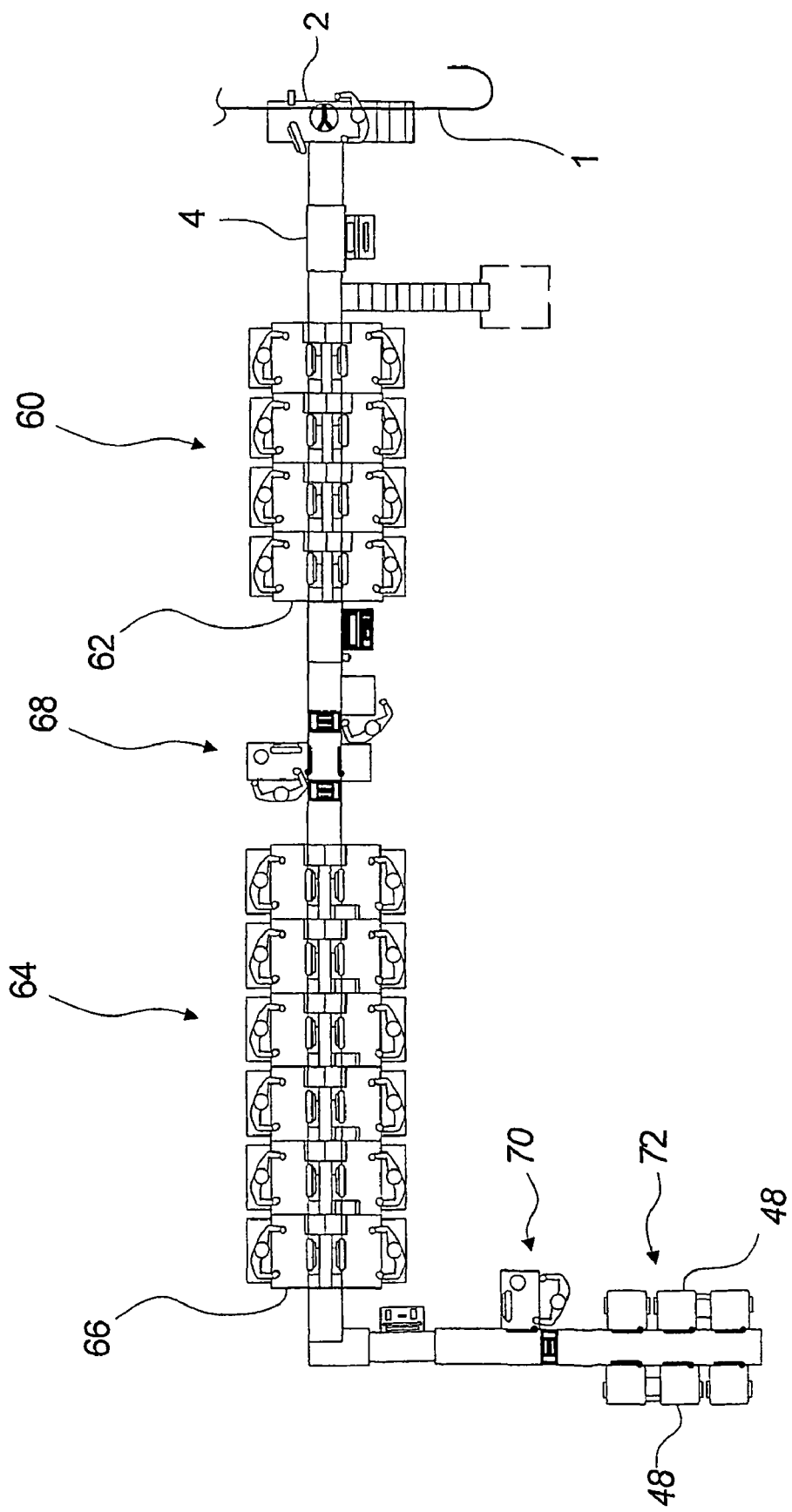

In the following, the invention will be described in more detail with reference to the figures, where FIG. 1 shows an example seen from above of an embodiment of a system for the cutting-up of slaughtered animals, for example pigs, beeves, calves etc., or parts hereof, FIG. 2 shows a part of the embodiment shown in FIG. 1, comprising coarse parting and quality control, similarly seen from above but in an enlarged version, FIG. 3 similarly shows a part of the embodiment shown in FIG. 1 in an enlarged version and comprising four workstations, and FIG. 4 shows another embodiment of a system for the cutting-up of slaughtered animals, for example pigs, beeves, calves etc. or parts hereof seen from above.

DETAILED DESCRIPTION

FIG. 1 shows in schematic form and seen from above an embodiment of a system for the cutting-up of slaughtered animals, for example pigs, beeves, calves etc. or parts hereof. In the following the embodiment will be described in more detail with reference to the parting of pigs, but it will be understood that this can apply to other slaughtered animals with the changes associated herewith which will be obvious to those familiar with the art. It will also be understood that this can involve parts of such animals, which are parted, and not "whole" animals. It will also be understood that items such as, for example, poultry, fish etc. can be involved.

As will be well known to those familiar with the art, an animal after slaughtering will normally be stored for a shorter period before further processing is effected, including parting. In this connection it must be noted that when there is general talk about processing, this will include a multitude of various actions and processes, including parting, trimming, de-boning, transportation, weighing, packaging etc., which will be obvious to an expert in this field.

When the pigs arrive after slaughtering, they are classified with regards to fat before they are placed in storage. In many places the pig is classified only in a single piece, such as e.g. the middle, but it will be an advantage for the method described and the system described if the pig is classified several places, for example the shoulder, the middle and the ham. This data is then stored for each animal. Moreover, a possible sorting can take place when the pig is conveyed into storage, for example with regard to fat classification. Other classifications and/or criteria can also be involved.

When the pig is taken out later, it can be identified via an identification mark, for example either a hook on which the pig is hung, or a tag-mark/ear-mark or the like. This can take place, for example, when the pig is led to the system shown in FIG. 1, for example via a conveyor rail system 1. When the pig's identification mark has been read, this is registered in a computer system, which possibly also contains information concerning the fat classification, the supplier and/or other data concerning the pig. It will be understood that this computer system can be included as a general control, registration and/or calculation part of the system, such as will be described in the following.

The pig is conveyed to a coarse parting station 2 where an operator effects a cutting-up into a number of larger pieces, for example with a saw. When the pig has been coarsely parted, it is transported further via e.g. a conveyor belt 3 in a fixed sequence, e.g. the ham first, then the middle and thereafter the shoulder and neck. This sequence will also be registered in the computer system, so that the passage of these parts through the system is known to the system. On the basis of this sequence, there is subsequently calculated the weight yield, for example the weight of meat at a coarse parting, for example on the four quarters, where the individual pieces are weighed in the passage of scales 4. The figure for this yield is shown on a screen 5 in front of the operator who carries out the coarse parting and the yield figures are calculated by the computer on the basis of the known fat classifications, the registered weight etc. The yield figure for the last pig to arrive is compared by means of the computer system against a cutting rule (cutting instruction) contained in the computer system and that part which has been processed up until the present and for which data is similarly registered and successively processed, for example summed-up for batches or the like. If the distribution percentage is incorrect, it will be shown on the screen 5. Moreover, it will be possible to see distribution percentages etc. via an accompanying PDA computer (not shown), for example a palm-top computer that can operate in a wireless manner in the production area. The yield is registered against each supplier. The PDA computer will also serve to provide an alarm, for example if the yield figure and/or distribution percentage etc. deviates from the target (falls short of or exceeds the target) or exceeds the tolerances.

When a neckpiece has been weighed, it is conveyed further along the conveyor belt 3 where it arrives at an operator 6 as it by means of a sweeper arm 7, which is controlled by the computer system, is led onto the worker's workstation. Here, the neck is trimmed for skin and fat. After skin and fat have been removed, the neckpiece is placed in a dispenser 8, after which it passes a scale 10. Here it is weighed and during the course of this process the computer system, which is aware of an identification of the neckpiece being handled, calculates the loss (this is not shown). Hereafter, the neck piece is led out to the belt 12 in such a manner that it can still be traced, for example by the computer system being informed when the neck piece is led out. It is possible that the product can be by-passed direct to a so-called Weber machine 14 by means of a sweeper arm 15 (FIG. 2), where said Weber machine 14 cuts the meat into strips.

The pieces of meat which are transported further along the conveyor belt 3 will be transferred to the conveyor belt 16 which leads them further to the feed-in 17 to the trimming table which is indicated in general by the reference FIG. 18. In this connection it will be recalled that the computer system has registered the sequence with which the various pieces of meat are introduced on to the belt 3, that the computer system has registered that possible neck pieces are removed from this sequence and by means of sensors, e.g. optical sensors or the like, (for example indicated at 20 and 21 in FIG. 2) disposed along the conveyor belts for example 3 and 16, the computer system can monitor the transport of the individual pieces of meat.

When the pieces of meat enter the feed-in 17 to the trimming table 18, they are allocated to the different operators, controlled by the computer system. As will be seen, the trimming table 18 comprises a number of workstations, e.g. 20, which can be placed on each side of the conveyor belt 16, which leads the pieces of meat in to the trimming table. Some of the operators placed at the workstations 20 have their specialties, i.e. that they de-bone and cut-up a certain coarse parting.

In order not to arrive at a situation where some operators are very busy with one type of raw material and others have nothing to do with another type of raw material, there are certain operators who can handle several different raw materials. Consequently, this means that they have their preferred types of cuts (e.g. ham, middle or forepart), but to equalise the capacity at the table, if necessary they will come to process e.g. shoulders and hams. What cuts each individual operator can deal with are defined by means of an identification for the individual operator, e.g. on an operator number. The identification for the individual operator is registered by the computer system when an operator occupies a workstation 20, e.g. by the operator keying-in his/her number, passing an ID card through a scanner or in another manner. When an operator leaves a workstation, he/she is automatically logged out of the system, e.g. by the workstation comprising a switch or the like which is activated when a person occupies the workstation. The computer system contains information concerning the individual operators, including information relating to their competence, i.e. what type of cutting operation they can handle and possibly other information such as training and so on. Furthermore, the system can comprise data concerning the output for the individual operator, which can be registered for earlier periods and/or for a current processing. The system can use this for the allocation of items to an operator, also on the basis of criteria concerning the output from an operator, so that an operator with a high output is allocated certain items. It will thus also be seen that the priorities can be changed when items are to be allocated to an operator.

As mentioned, the meat pieces are allocated by the computer system in a manner such as is also shown in FIG. 3, which shows a section of the trimming table with a number of workstations 20. Controlled by the computer system, a sweeper arm 24 can lead a piece of meat 22 to a workstation 20. The pieces of meat come out into a tray 26 placed at the one side of the operator. The tray can be placed approximately 5 cm lower than the feed-in belt 17. To the widest possible extent, there shall always be meat in the tray 26, but only one piece.

When an operator is finished with a piece of meat, he indicates to the computer system that the task has been concluded, for example by sweeping his knife past a sensor. This can be indicated in other ways and possibly be effected automatically. Hereafter, the tray 26 will tilt down towards the cutting plate 28. Hereafter, the operator draws down the meat 22 on to the cutting plate 28. When a piece of meat 22 is allocated to an operator, the weight and the fat percentage are as mentioned known and registered in the computer system, in that this is registered in connection with the weighing carried out after the coarse parting and the registration of the fat percentage which is registered at the feed-in. Similarly, other parameters can be known, for example pH-values, e.g. for hams, inasmuch as such a value can be measured at the feed-in and registered in the system.

On the basis of this information, the operator is informed how the meat is desired to be cut up. The cutting operator is provided with the information via a display screen, preferably a colour screen 30 or the like which is placed in front of each operator. The information is provided by the computer system, which also has knowledge of one or more customer orders, which shall be fulfilled. On the basis of these customer orders, on the basis of the pigs or pieces of meat allocated and the information which has been registered for these and/or on the basis of the given operator competence and background of the pieces of meat which are already processed and distributed in accordance with customer orders, the computer system calculates the necessary information for the individual workstation/operator.

When the operator begins to cut the meat, the screen 30 will constantly provide guidance relating to the manner in which it is to be cut up, i.e. a so-called cutting rule (cutting instruction). The cutting rule (cutting instruction), e.g. with instructional pictures, will be displayed in the sequence in which the meat shall be cut up.

When a piece of meat has been cut free, it will be indicated, for example, in which of the compartments 32, 33 etc. in front of the operator the meat is to be placed. There will be compartments, which are used mainly for the same purpose, e.g. bone, fat and skin. Two of the compartments, for example, can be accessible the whole time during the cutting process. Two other compartments, for example, can change status depending on how far has been reached in the cutting rule (cutting instruction) or depending on other parameters such as specific customer orders etc. The placing of the free-cut pieces can take place in other ways than that described. Examples of other ways, whereby traceability is also ensured, will be discussed later.

If an operator is in doubt concerning the manner in which a piece of meat shall be cut, help can be obtained via video, alternatively picture material, text etc. via the screen 30, inasmuch as there lies a documented and defined standard behind each cut against a given customer and customer order.

If it is desirable that a product is hung on a so-called "Christmas tree", or for example placed on or in other special transport means such as e.g. Vemag trolleys etc., this can be done, for example, at the first cutting places. As far as Christmas trees are concerned, this will happen mainly in connection with hams. When a ham has been trimmed, it is hung on the Christmas tree on a rail system 34. The ham can either be marked individually with bar code or batch number etc. and possibly weight, in that a label or the like can be written out via the computer system. The weight can come to appear in the form of weighed-in weight minus trim, or via the scale 36 which are placed in the table at each workstation. Alternatively, it can be effected on the basis of a whole Christmas tree. Corresponding arrangements can apply for other special means of transport.

The scale 36 in the table can also be used for cutting fixed-weight cuts. If, for example, some customers want a joint of a given size, it can be decided in the rule that when the joint has been cut free, it is placed on the scale 36. The system can now inform the operator of how much shall be cut off (e.g. indicated in grams). Expediently, the scale can instead register how much is to be cut off. The operator can then place the joint on the cutting table, cut a piece off the joint and place it on the scale. The scale will hereafter indicate how much more shall be cut off before the weight criterion is reached, the operator can again cut a piece off and place it on the scale (together with the first cut-off piece) and so on, until the desired weight is reached, which the scale can for example indicate by the flashing of a lamp or in another manner. The cut off piece or pieces are removed from the scale and placed in accordance with instructions in one of the containers or the compartments 32 and 33, from where they form part of the further processing.

When a piece of meat has been cut free, this is registered by means of a sensor (not shown) in the collection container 32. A change can be made automatically to the next cutting free. When there is meat in the collection container 32 (or one of the other containers 33 which can have a corresponding status), this can be emptied out automatically on to an underlying belt, which will extend under the feed-in belt 17 and e.g. in the opposite direction to this. As shown in FIG. 1, the processed meat pieces can be led under the conveyor belt 16 towards a quality control 44, which will be described in more detail later. Depending on the specification, customer order etc. and controlled by the computer system, the meat is now transported via the conveyor belt 12 to a given further processing or packaging machine, e.g. 14, 38, 40, and/or for wrapping, packaging etc. which can take place at a multiple of packing stations 48 controlled by the computer system which can activate sweeper arms 42.

The drop-sequence out of the trimming table is controlled in such a way that drops are effected at the greatest possible frequency, but always in such a manner that it is known where the product is. It shall be noted, however, that in addition to the system being able to forward the items in such a manner that the traceability is ensured, e.g. by time allocation, the system can be arranged to control the drop frequency in relation to other factors, such as the working speed at later stages in the processing. For example, the drop frequency for items, which shall be packed, will not exceed the working speed of a packing machine. Instead, a buffer of items can be formed at e.g. the workstations, so that an inappropriate accumulation is not created later in the process.

When the meat comes out from the table, it will pass the scale 10 where it is weighed and then transferred to the belt 12. Here, at the workstation 44, a quality control will be effected at frequent intervals. The control is effected by the regular selection of samples by means of an arm 50 (FIG. 2), which removes the pieces of meat. The quality inspector evaluates the meat against the cutting rule, such as this is displayed by the computer system, e.g. on a screen 52. If there is an error in relation to the rule, a video button is pressed and the operator who has cut the meat can now be put in direct graphic connection with the quality inspector, in that a picture of the relevant piece of meat is displayed on the screen 30 in front of the operator. For this purpose, the station 44 for quality control is provided with a camera 54. Via a possible textual or audio connection, the operator hereby receives comments from the quality inspector. In connection with textual feedback, it shall be mentioned that use can be made of standard texts adapted for normally arising errors and these standard texts can be selected, e.g. by means of codes. The object of the feedback at the quality control can, e.g., be that the quality inspector shall help to rectify the rules to the widest possible extent.

It can be envisaged that the pictures of the pieces of meat, which are accepted, are possibly stored in a database and thus serving as documentation for the customer. Such documentation can eventually be sent to the customer electronically, made accessible via the Internet or downloaded by the customer in another manner. This can also be done immediately after the quality control and e.g. before packing and dispatch to the customer. Moreover, such documentation can be rendered accessible for a customer before a contract is entered into, e.g. also in connection with contract negotiations. A customer can thus be presented with the documentation for the quality corresponding to different price levels, so that this can form part of the negotiations.

When the quality inspector has finished checking the meat, the meat is placed in a dispenser which then takes care that the meat is let out on to the conveyor 12 as quickly as possible, though such as is generally the case in connection with the invention that the system can trace the individual piece of meat. It can also be envisaged that individual items shall be discarded, which is also registered in the system, so that compensation can be made for the intended customer order. Moreover, a downgrading can be effected for individual items, whereby these items are registered under a lower quality level. This is similarly registered in the system.

Meat, which leaves the table, can be distributed to various machines, e.g. 14, 38 and 40, also Vemag trolleys, packing stations 48, portion cutters etc.

It will be understood that labels for packing provided with bar codes, batch numbers etc. and possibly weight or other information can be printed out by means of the computer system.

Moreover, it shall be noted that the system can be arranged in such a manner that in connection with the wrapping and packaging of the individual customer orders, a selection of a specific type of packing can be made depending on the concrete customer order, e.g. taking into consideration the types of cuts, customer requirements, further transport and handling of packing etc. Different types of packing materials can thus be available at the packing machines, where the system can thus automatically select the correct type or can indicate or provide information concerning the correct type of packing for a given customer order or for a part of such an order.

With regard to cutting plates 28, the system can be arranged so that it registers the intervals at which the cutting plates shall be turned and/or replaced. The operator is informed via the screen 30 that it is time to turn or change. The system can be configured with the possibility that via a sensor (not shown), which can be placed under and/or in the cutting plate and/or co-operating with means in a support part of the cutting plate, it is possible to register whether the plate has been turned and/or changed. If this has not taken place, the operator is warned again. If the system hereafter does not register that a cutting plate has been turned or changed, the system can ensure shortly after that the relevant operator does not receive more meat.

In the event that an operator receives a piece of meat containing an abscess, it will be possible to register this via the terminal, e.g. the screen terminal 30, for the relevant supplier. This will force the cutting plate 30 to be changed out of schedule. The meat is removed manually from the line and the necessary cleaning of materials such as the conveyor belt is carried out.

In order to monitor the line, the system is connected to a PDA computer such as, e.g., a Palmtop computer, which works in a wireless manner (in the production area). The Palmtop computer can show the screen pictures which are otherwise in the system and possible alarm functions e.g. in connection with technical breakdown, deviations in output etc., and said alarm functions will be active regardless of whether the PDA computer is actually used for display etc. at the relevant time.

A second embodiment of the invention is illustrated in FIG. 4, which in essence is built up with elements, workstations etc. corresponding to those described in connection with FIGS. 1-3, but where the main structure differs from that shown in FIG. 1.

In the same way as described earlier, slaughtered pigs, for example, are fed to the system at the feed-in 1, after which a coarse parting is carried out at a workstation. The coarse-parted pieces are led via scale 4 to a de-boning table 60, which comprises a series of workstations 62 at which only de-boning is carried out before the pieces—still in a traceable manner—are conveyed further to a quality control station 68, where a quality control of the work carried out is effected as described earlier. This can be done with the use of video, textual and/or audio communication as described above, in that the stations are configured as described above, for example the workstations 62 with screen and station 68 with screen and camera.

The de-boned pieces are conveyed further to a trimming section 64 comprising a number of workstations 66, where the cutting-up is carried out in the same way as described in connection with FIGS. 1-3, i.e. also while making use of cutting rules (cutting instructions) etc. supplied by the computer system.

From the trimming table section 64, the meat cuts are conveyed forward past a further quality control 70, which is arranged and functions in a manner corresponding to that already discussed. Finally, the meat pieces are led further towards a packing and/or wrapping section 72 where, for example, packing can take place at stations 48. It will be understood that in the same manner as already described, the computer system can print out labels for packing provided with bar codes, batch numbers etc. and possibly weight or other information etc.

With this embodiment, the individual stations 62 and 66 can be manned by operators who do not need to be trained for several tasks or within a broad field, in that each individual operator only need to carry out a minor part of the process.

It will be understood that the parts forming this embodiment can be configured in the same way as described in connection with the first-mentioned embodiment, possibly with the necessary adjustments. It will thus also be understood that variations, which are mentioned in connection with the first embodiment, can also find application in connection with the embodiment shown in FIG. 4.

It is obvious that the invention, such as disclosed in the claims, can be varied in different ways. The workstations can thus be configured in many different ways and the general structure can be arranged in many different ways.

For example, instead of the compartments or containers 32 and 33 shown in FIG. 3, use can be made of a belt on which the cuts of meat can be placed in that sequence in which they are cut off. In this manner a buffer with first-in first-out function is built up automatically and traceability can be established when the pieces of meat are transported further. It can also be envisaged that use can be made of a wheel divided into compartments, which can be implemented so that it assumes essentially the same function as the belt. A further example can be a small elevator into which the pieces of meat are placed. Solutions can also be configured where there are not so many compartments as are described in connection with FIG. 3, but where the take-away (the conveyor belt) underneath is so quick that the pieces are simply placed in a single (or just a few) compartments and where the take-away then carries them away still with full traceability. Moreover, solutions can be configured where there are several compartments in which the operator can place the relevant piece of meat and where he/she identifies the compartment by means of a push-button, with the knife or via other corresponding means.

The invention claimed is:

1. A method for monitoring and tracking the processing of a plurality of meat items which originated from an animal, said processing utilizing instructions, said method comprising the steps of:

performing one or more registering steps on at least one piece of meat of said plurality of meat items, said registering steps including at least one of:
registering said one piece of meat, registering an identification of a supplier of said piece of meat, and/or registering an identification of the animal from which said piece of meat originated;

allocating said piece of meat to one of a plurality of workstations;

registering an identification of said one of said plurality of workstations; and processing said piece of meat into a plurality of meat cuttings at said one of said plurality of workstations utilizing said instructions, wherein traceability is established between one or more of said plurality of meat cuttings and the registered piece of meat, the identified supplier, and/or the identified animal.

2. The method according to claim 1, wherein said instructions are in accordance with filling one or more customer orders.

3. The method according to claim 1, wherein said step of allocating said piece of meat is effected with regard to predetermined criteria including a capacity of each of said plurality of workstations.

4. The method according to claim 1, wherein, after said registering step said processing includes the steps of carrying out a coarse cutting into a plurality of meat items, after which transporting said individual items in a predetermined sequence for processing into said plurality of cuttings, and registering said sequence.

5. The method according to claim 1, further comprising the step of placing said plurality of cuttings in or on a transport mechanism, wherein said one or more of said meat cuttings can be traced and/or is identifiable.

6. The method according to claim 5, further comprising the steps of:

detecting the passage of said one or more of said plurality of cuttings along said transport mechanism; and registering information about said detecting for use for establishing said traceability.

7. The method according to claim 5 or 6, wherein said step of placing is performed with regard to concrete instructions to an operator, such that one or more locations on said transport mechanism can be used in a flexible manner.

8. The method according to claim 1, wherein said instructions are specific in relation to said piece of meat, and wherein said instructions can be effected visually in an automatic and/or user-controlled manner.

9. The method according to claim 1, wherein said instructions include visual, textual and/or audio-based instructions.

10. The method according to claim 1, further comprising the steps of:

weighing one or more of said plurality of meat cuttings; and providing information relating to a deviation from a weight criteria set for said one or more of said plurality of meat cuttings.

11. The method according to claim 1, further comprising the step of effecting quality control in connection with said processing by utilizing vision equipment for adjusting visual instructions included in said instructions.

12. The method according to claim 1, further comprising the step of effecting quality control in connection with said processing by utilizing vision equipment for generating data concerning quality controlled items for storing in a database.

13. The method according to claim 11 or 12, wherein said step of effecting quality control includes the step of storing data for use in generating documentation of the quality level for a given customer order.

14. The method according to claim 11 or 12, wherein textual and/or audio communication is utilized in said step of effecting quality control.

15. The method according to claim 1, further comprising the step of, upon conclusion of said processing of said piece of meat, providing an indication of such conclusion, either automatically or by an operator action, wherein a processing of a subsequent meat item with an identification associated therewith is initiated.

16. The method according to claim 1, further comprising the step of monitoring and/or controlling of maintenance conditions effecting the quality of a finished cut product.

17. The method according to claim 1, further comprising the step of registering information concerning characteristics of one or more operators of one or more of said plurality of workstations.

18. The method according claim 1, wherein one or more of said plurality of meat cuttings are traceable to one or more of the supplier, a classification, and the originating animal.

19. The method of claim 1, wherein performing the at least one registering steps includes performing at least two of the registering steps on the same piece of meat.

20. A system for monitoring and tracking the processing of a plurality of meat items which originated from an animal, said processing utilizing instructions, said system comprising:

means for identifying and registering at least one piece of meat from said plurality of meat items, a supplier of said piece of meat, and/or the animal from which said piece of meat originated;

means for allocating said piece of meat to one of a plurality of workstations;

means for registering an identification of said one of said plurality of workstations; and means for processing said piece of meat into a plurality of meat cuttings at said one of said plurality of workstations utilizing said instructions, wherein traceability is established between one or more of said plurality of meat cuttings and the registered and identified piece of meat, the registered and identified supplier, and/or the registered and identified animal.

21. The system according to claim 20, further comprising one or more computers including said means for registering and said means for allocating, wherein said one or more computers establish said traceability.

22. The system according to claim 20, wherein said means for allocating utilizes one or more registered customer orders, and further wherein said one or more computers are for transmitting said instructions to one or more of said plurality of workstations so that said customer order orders are fulfilled.

23. The system according to claim 20, wherein said means for allocation are performed with regard to predetermined criteria including a capacity of each of said plurality of workstations.

24. The system according to claim 20, wherein, after said identification and registration, said means for processing performs a coarse cutting into a plurality of meat items, each of which are transported in a predetermined sequence for processing into said plurality of cuttings, said sequence being registered.

25. The system according to claim 20, further comprising means for storing and/or means for transporting one or more of said plurality of cuttings, wherein each of said plurality of cuttings is traceable and/or identifiable.

26. The system according to claim 25, further comprising means for detecting the passage of said one or more of said plurality of cuttings along transport routes of said means for transporting for establishing said traceability.

27. The system according to claim 20, further comprising means for receiving one or more of said plurality of cuttings with regard to said instructions including instructions to an operator for a placing of said cuttings.

28. The system according to claim 20, wherein said instructions include instructions specific to said piece of meat, and wherein said instructions can be provided visually and/or can be controlled automatically by the system and/or can be user-controlled.

29. The system according to claim 20, further comprising means for communicating visual, textual and/or audio based instructions included in said instructions.

30. The system according to claim 20, wherein one or more of said plurality of workstations includes a scale for weighing one or more of said plurality of meat cuttings and for providing immediate information concerning a deviation from a weight criteria for said one or more of said plurality of meat cuttings.

31. The system according to claim 20, further comprising means for facilitating quality control in connection with said processing by adjusting vision equipment instructions included in said instructions.

32. The system according to claim 20, further comprising vision equipment for quality control in connection with said processing by storing of data in a database concerning quality-controlled items.

33. The system according to one of claims 31 and 32, wherein said quality control is supported by storing data for use in generating documentation of the quality level for a given customer order.

34. The system according to one of claim 31 or 32, further comprising means for providing textual and/or audio communications to support said quality control.

35. The system according to claim 20, further comprising means for registration the conclusion of said processing of said piece of meat automatically or in connection with an action, wherein the system initiates a cutting of a subsequent piece of meat with an identification associated therewith.

36. The system according to claim 20, further comprising means for monitoring and/or controlling maintenance activities.

37. The system according to claim 20, further comprising means for registering information relating to one or more operators.

38. The system according to claim 20, further comprising means for tracing and/or identifying one or more of said plurality of meat cuttings.

39. A method for processing a meat item comprising the steps of:
    registering one of a plurality of workers at a corresponding one of a plurality of workstations;
    allocating said meat item to an allocated one of said plurality of workstations based on both characteristics of said allocated workstation and characteristics of the worker registered at said allocated workstation; and
    processing said meat item into a plurality of meat cuttings at said allocated workstation.

40. A method for processing one or more of a plurality of meat items according to a customer order, said method comprising the steps of:
    receiving an order from a customer;
    generating cutting instructions at least partially according to the customer order;
    associating said cutting instructions with said one or more of said plurality of meat items;
    allocating said one or more of said plurality of meat items to an allocated one or more of a plurality of workstations;
    processing said one or more of said plurality of meat items into a plurality of meat cuttings at said one or more allocated workstations utilizing said instructions; and
    registering some portion of said plurality of meat cuttings with said customer order to provide traceability.

41. A method for processing a meat item comprising the steps of:
    providing a set of cutting instructions;
    registering one of a plurality of workers at a corresponding one of a plurality of workstations;
    allocating said meat item to an allocated one of said plurality of workstations;
    modifying said instructions based on characteristics of one or both of said allocated workstation and the worker registered at said allocated workstation; and
    processing said meat item into a plurality of meat cuttings at said allocated workstation utilizing said modified instructions.

42. A method for processing a meat item comprising the steps of:
    providing a set of cutting instructions, said cutting instructions including a plurality of optional cutting steps;
    allocating said meat item to one of a plurality of workstations;
    displaying said cutting instructions to a worker at said allocated workstation; and
    processing said meat item into a plurality of meat cuttings at said allocated workstation utilizing said instructions, wherein the worker is permitted to implement one, none, or a plurality of said optional cutting steps during said processing.

* * * * *